ized Patent
Lee et al.

(10) Patent No.: US 7,782,402 B2
(45) Date of Patent: Aug. 24, 2010

(54) APPARATUS AND METHOD FOR TEMPORAL NOISE REDUCTION AND MOTION ENHANCEMENT

(75) Inventors: Wei-Kuo Lee, Hsin-Chu Hsien (TW);
Shih-Chung Wang, Hsin-Chu (TW);
Yi-Fan Chen, Tai-Chung (TW)

(73) Assignee: MStar Semiconductor, Inc., ChuPei, Hsin-Chu Hsien (TW)

( * ) Notice: Subject to any disclaimer, the term of this patent is extended or adjusted under 35 U.S.C. 154(b) by 1077 days.

(21) Appl. No.: 11/456,866

(22) Filed: Jul. 12, 2006

(65) Prior Publication Data
US 2007/0211175 A1  Sep. 13, 2007

(30) Foreign Application Priority Data
Mar. 9, 2006  (TW) ............... 95107992 A

(51) Int. Cl.
*H04N 5/217* (2006.01)
*H04N 5/21* (2006.01)

(52) U.S. Cl. .................. 348/606; 348/607; 348/622; 348/625

(58) Field of Classification Search ......... 348/606–607, 348/622–625, 701, 620, 627–630, 241–242, 348/252–253, 533, 615, 699–700, 618; 382/260–261, 382/107, 263–264, 266, 275; 345/611; *H04N 5/217, H04N 5/21*
See application file for complete search history.

(56) References Cited

U.S. PATENT DOCUMENTS

| | | | |
|---|---|---|---|
| 5,757,977 A * | 5/1998 | Mancuso et al. | 382/260 |
| 6,067,125 A | 5/2000 | May | |
| 6,774,943 B1 * | 8/2004 | Kao et al. | 348/252 |
| 7,009,662 B2 * | 3/2006 | Ojo et al. | 348/625 |
| 7,295,616 B2 * | 11/2007 | Sun et al. | 375/240.27 |
| 7,388,621 B2 * | 6/2008 | Hsu | 348/606 |
| 7,538,822 B2 * | 5/2009 | Lee et al. | 348/606 |

* cited by examiner

*Primary Examiner*—Trang U Tran
(74) *Attorney, Agent, or Firm*—Winston Hsu

(57) ABSTRACT

The present invention provides an apparatus and corresponding method for reducing temporal noise of a target frame and enhancing the motion of the target frame. The apparatus includes a storage device, a temporal noise reducing circuit, and a motion enhancing circuit. The storage device stores a first filtered signal of a previous frame. The previous frame is previous to the target frame. The temporal noise reducing circuit reduces temporal noise of the target frame according to the first filtered signal and an image signal of the target frame. The temporal noise reducing circuit then generates a second filtered signal of the target frame, which is stored in the storage device. The motion enhancing circuit enhances the motion of the target frame according to the first and the second filtered signals, and generates a motion-enhanced signal of the target frame.

13 Claims, 7 Drawing Sheets

APPARATUS AND METHOD FOR TEMPORAL NOISE REDUCTION AND MOTION ENHANCEMENT

BACKGROUND OF THE INVENTION

1. Field of the Invention

The invention relates to an image processing method, and more particularly, to an image processing device and related method for reducing temporal noise of a target frame and enhancing the motion of the target frame.

2. Description of the Prior Art

In general, in order to enable an image signal to have a better displaying effect, the image signal is often processed, for example, a temporal noise reduction operation or a motion enhancement operation may be performed on the image signal. Please refer to FIG. 1, which is a block diagram of a conventional temporal noise filtering device 100. As shown in FIG. 1, the temporal noise filtering device 100 comprises a temporal noise reducing circuit 110 and a storage device 120. The temporal noise reducing circuit 110 receives luminance Y_IN[N] of an $N^{th}$ frame in an image signal, and reads a filtered signal Y_NR[N−1] from the storage device 120, where the filtered signal is generated by performing the temporal noise reduction operation on the $(N-1)^{th}$ frame. The temporal noise reducing circuit 110 performs the temporal noise reduction operation on the current frame ($N^{th}$ frame) according to the motion value between the luminance information Y_IN[N] of the current frame and the filtered signal Y_NR[N−1] of the previous frame ($(N-1)^{th}$ frame). The generated result (the filtered signal Y_NR[N] generated by performing the temporal noise reduction operation on the $N^{th}$ frame) is then output to a next stage (not shown) and the generated result is stored in the storage device 120. From the above illustration, it can be seen that the storage device 120 plays the role of temporary storage and further provides a previous filtered signal to the temporal noise reducing circuit 110.

Please refer to FIG. 2, which is a block diagram of a conventional motion enhancer 200. As shown in FIG. 2, the motion enhancer 200 comprises a motion enhancing circuit 210 and a storage device 220. The motion enhancing circuit 210 receives the luminance information Y_IN[N] of the $N^{th}$ frame in an image signal and simultaneously stores the luminance information Y_IN[N] into the storage device 220. Moreover, the motion enhancing circuit 210 reads the luminance information Y_IN[N−1] of the previous $(N-1)^{th}$ frame and adjusts the luminance motion of the $N^{th}$ frame according to the luminance information Y_IN[N] and the luminance information Y_IN[N−1] to enhance the motion of the $N^{th}$ frame. Similarly, in the motion enhancer 200, the storage device 220 has the function of temporary storage and further provides the information of a previous frame to the motion enhancing circuit 210.

Under most situations, the image signal should be processed through the above-mentioned temporal noise reduction operation and the motion enhancement operation. If, however, the above-mentioned circuits (the motion enhancer 200 and the temporal noise filtering device 100) operate separately, the cost will be high and more hardware will be needed.

SUMMARY OF THE INVENTION

It is therefore one of the primary objectives of the claimed invention to provide a device and related method for reducing the temporal noise of a target frame and enhancing the motion of the target frame, to solve the above-mentioned problem.

According to an exemplary embodiment of the claimed invention, a device for reducing temporal noise of a target frame and enhancing a motion of the target frame is disclosed. The device comprises: a storage device, for storing a first filtered signal of a previous frame; a temporal noise reducing circuit, coupled to the storage device, for receiving the first filtered signal and a first image signal corresponding to the target frame, reducing the temporal noise of the target frame according to the first filtered signal and the first image signal to generate a second filtered signal corresponding to the target frame, and storing the second filtered signal into the storage device; and a motion enhancing circuit, coupled to the storage device and the temporal noise reduction circuit, for enhancing the motion of the target frame according to the first filtered signal and the second filtered signal to generate a motion-enhanced signal corresponding to the target frame.

According to another exemplary embodiment of the claimed invention, a method for reducing temporal noise of a target frame and enhancing a motion of the target frame is disclosed. The method comprises: providing a storage device; filtering a previous frame to generate a first filtered signal, and storing the first filtered signal into the storage device, wherein the previous frame is previous to the target frame; reducing the temporal noise of the target frame according to the first filtered signal and a first image signal corresponding to the target frame to generate a second filtered signal corresponding to the target frame, and storing the second filtered signal into the storage device; and enhancing the motion of the target frame according to the first filtered signal and the second filtered signal, and generating a motion-enhanced signal corresponding to the target frame.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
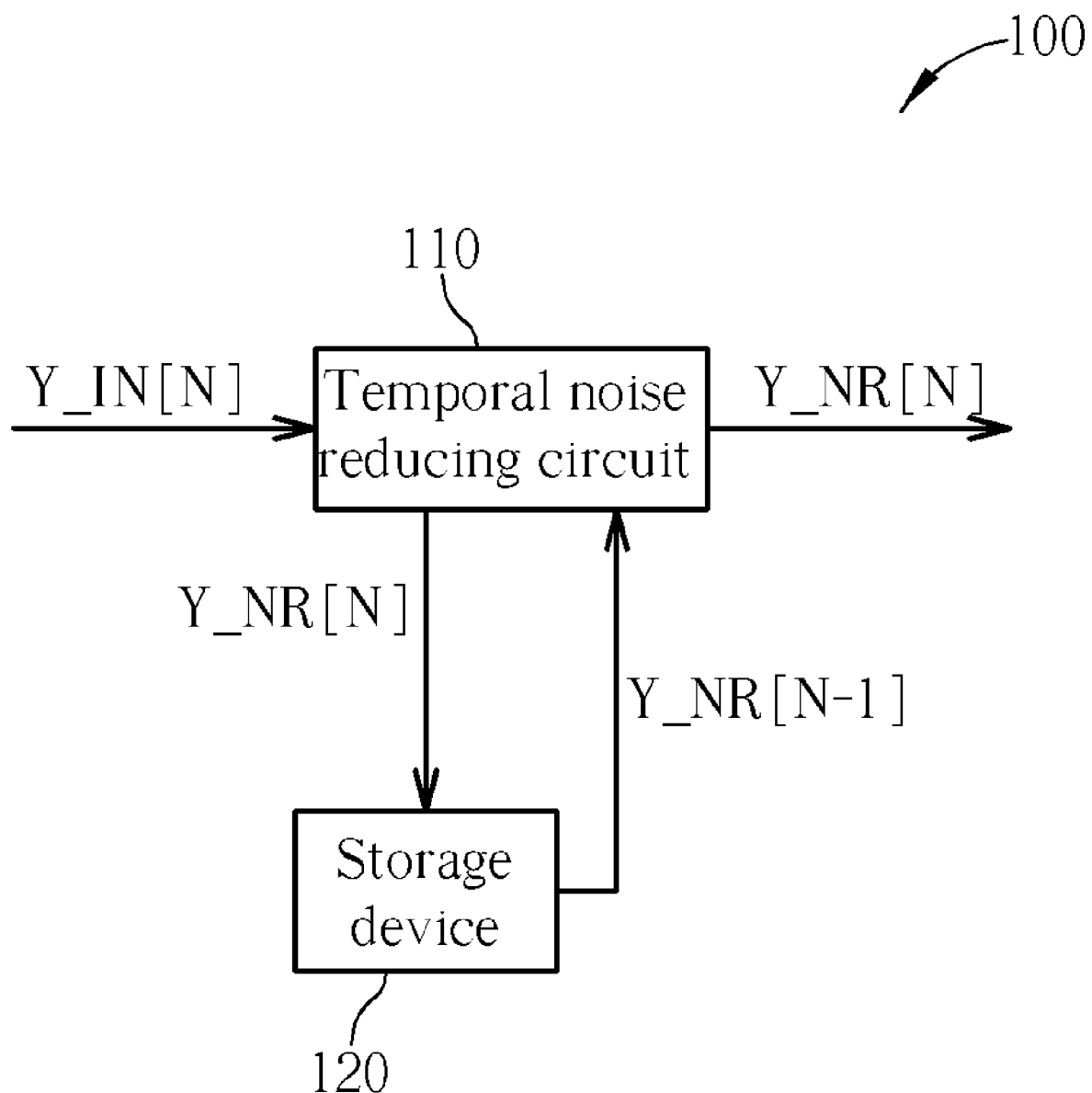
FIG. 1 is a block diagram of a conventional temporal noise filtering device.
Figure 2:
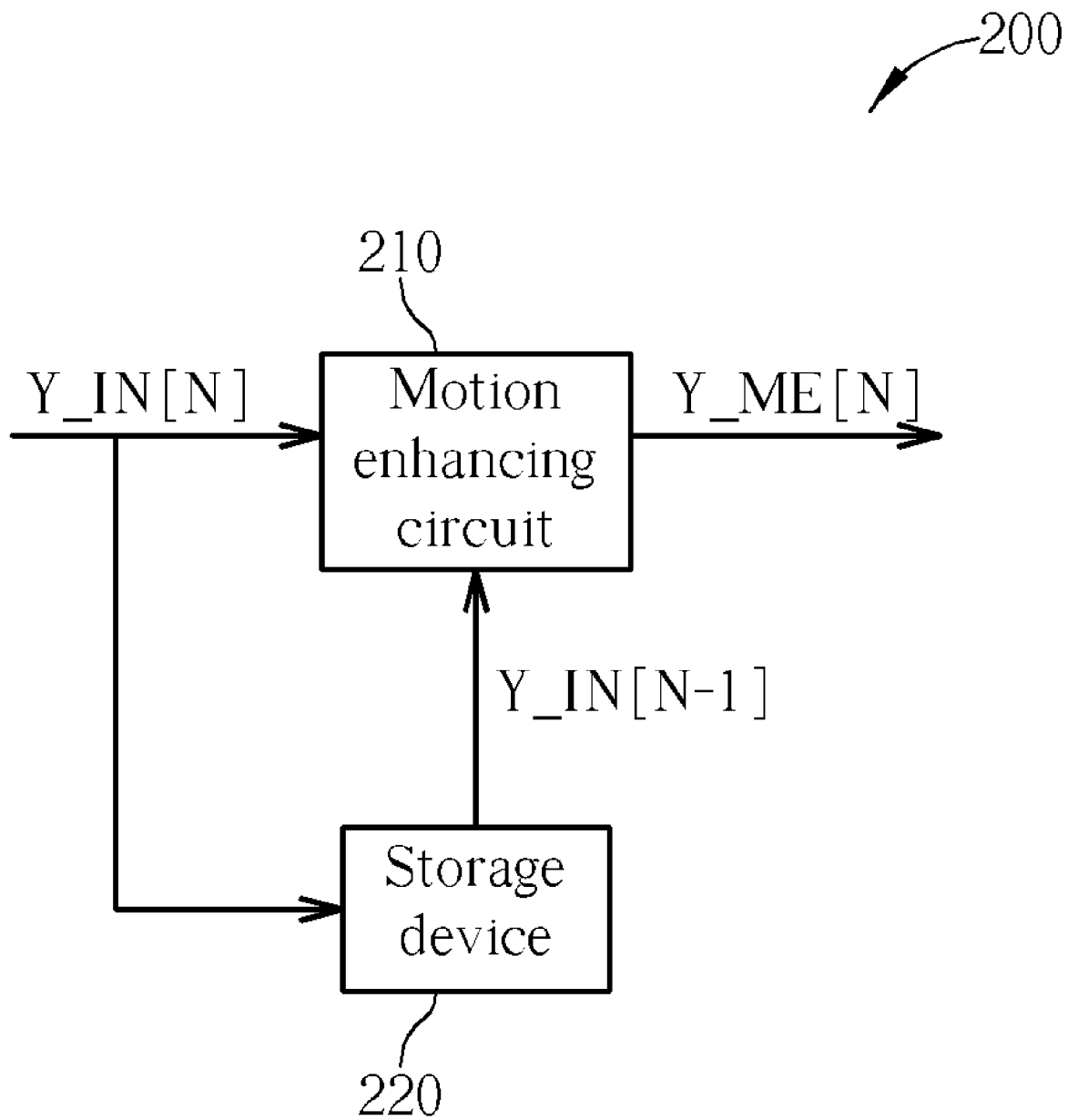
FIG. 2 is a block diagram of a conventional motion enhancer.
Figure 3:
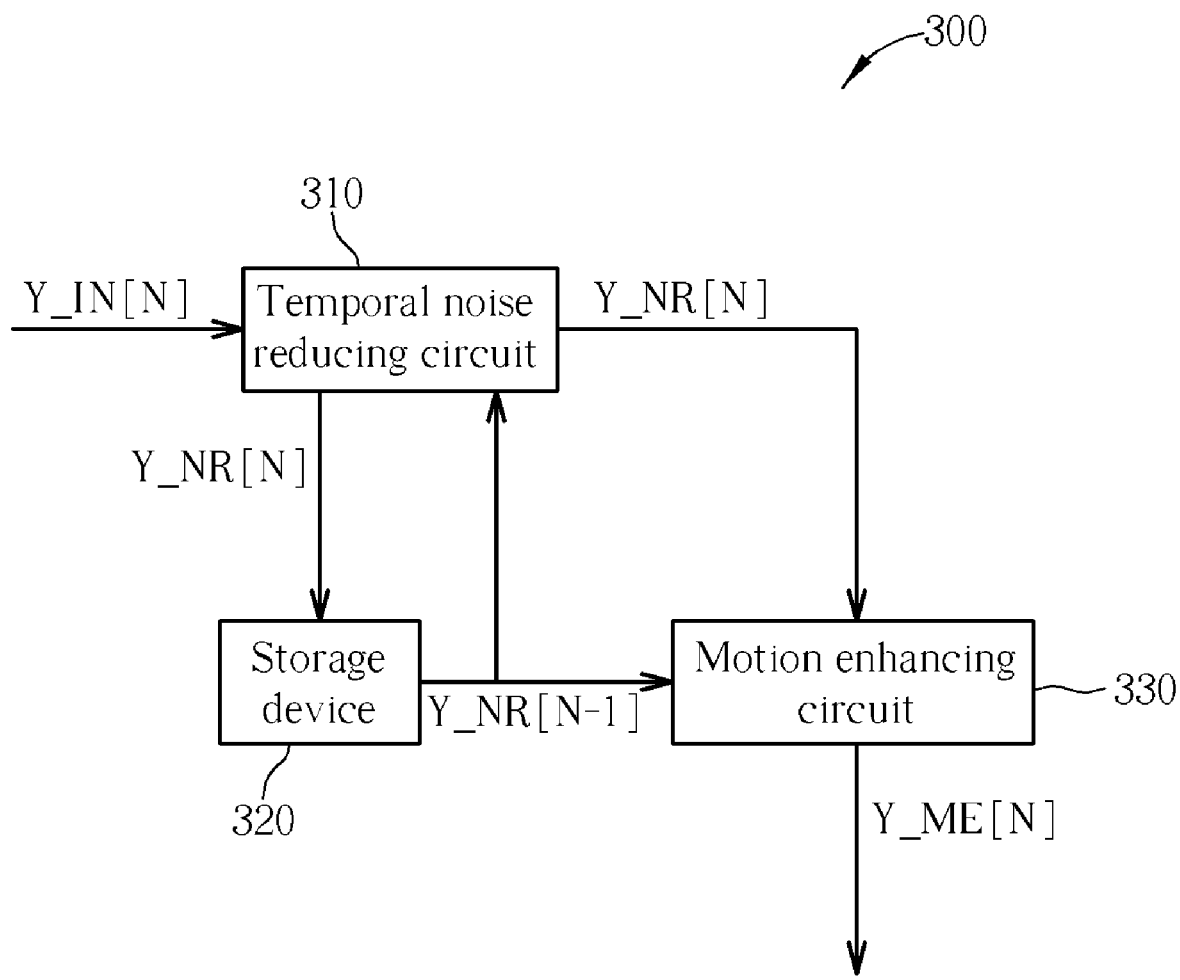
FIG. 3 is a block diagram of a device capable of simultaneously reducing the temporal noise of the target frame and enhancing the motion of the target frame according to the present invention.

Please refer to FIG. 3, which is a block diagram of a device 300 according to the present invention, capable of simultaneously reducing the temporal noise of the target frame and enhancing the motion of the target frame. The device 300 comprises a temporal noise reducing circuit 310, a storage device 320, and a motion enhancing circuit 330. Please note that the storage device 320 can be a dynamic random access memory (DRAM) or a static random access memory (SRAM).

Figure 4:
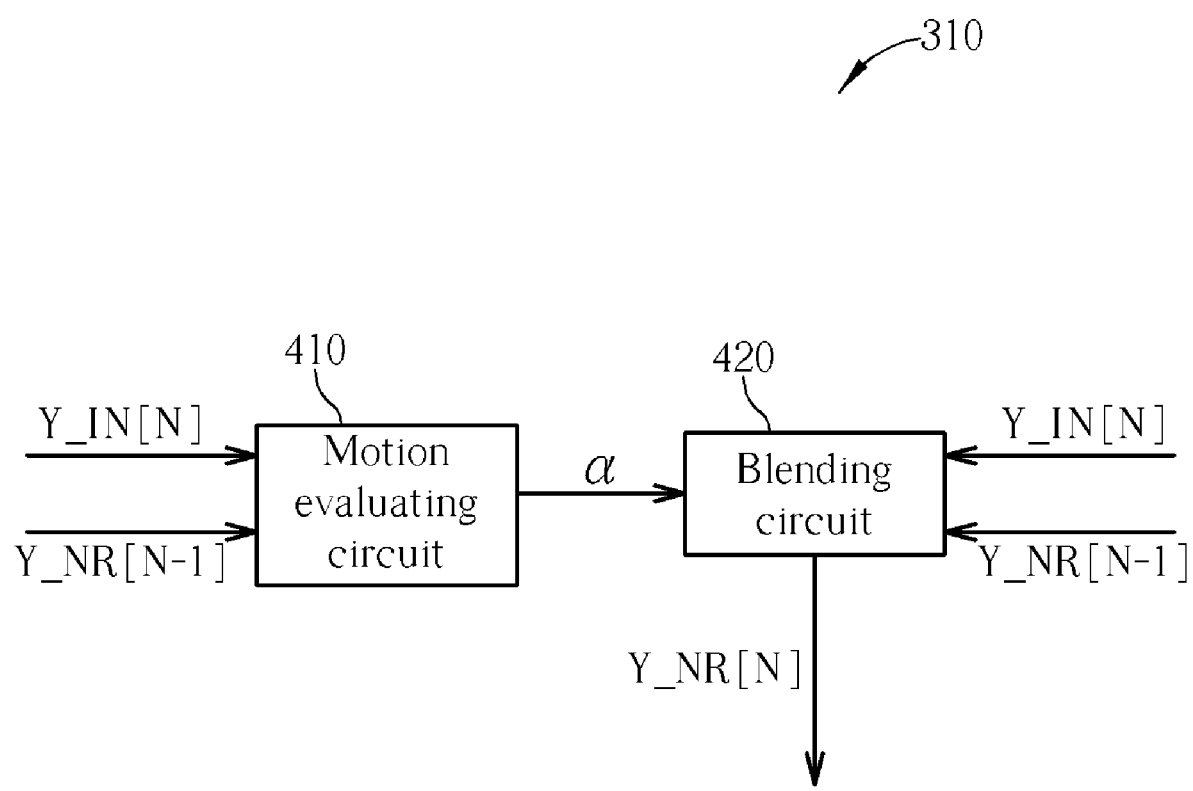
FIG. 4 is a block diagram of a temporal noise reducing circuit according to the present invention.

Please refer to FIG. 4 in conjunction with FIG. 3. FIG. 4 is a block diagram of a temporal noise reducing circuit 310 according to the present invention. The temporal noise reducing circuit 310 receives the luminance information Y_IN[N] of the $N^{th}$ frame in an image signal and reads the filtered signal Y_NR[N−1] from the storage device 320, which is generated by performing the temporal noise reduction operation on the $(N-1)^{th}$ frame. Then, the motion evaluating circuit 410 compares the $N^{th}$ frame with the $(N-1)^{th}$ frame to evaluate the motion value of the $N^{th}$ frame such that a corresponding weighting factor α can be generated. Please note that the weighting factor α is between 0 and 1, where if the motion value is larger the weighting factor α is smaller. Furthermore, the blending circuit 420 blends the luminance information Y_IN[N] and the luminance information Y_NR[N−1] according to the weighting factor α and the following equation to generate the filtered signal, which is generated through performing the temporal noise reduction operation on the $N^{th}$ frame.

$$Y\_NR[N]=\alpha \times Y\_NR[N-1]+(1-\alpha) \times Y\_IN[N] \quad \text{equation (1)}$$

The filtered signal Y_NR[N] is outputted to the next stage motion enhancing circuit 330 and stored in the storage device 320.

Figure 5:
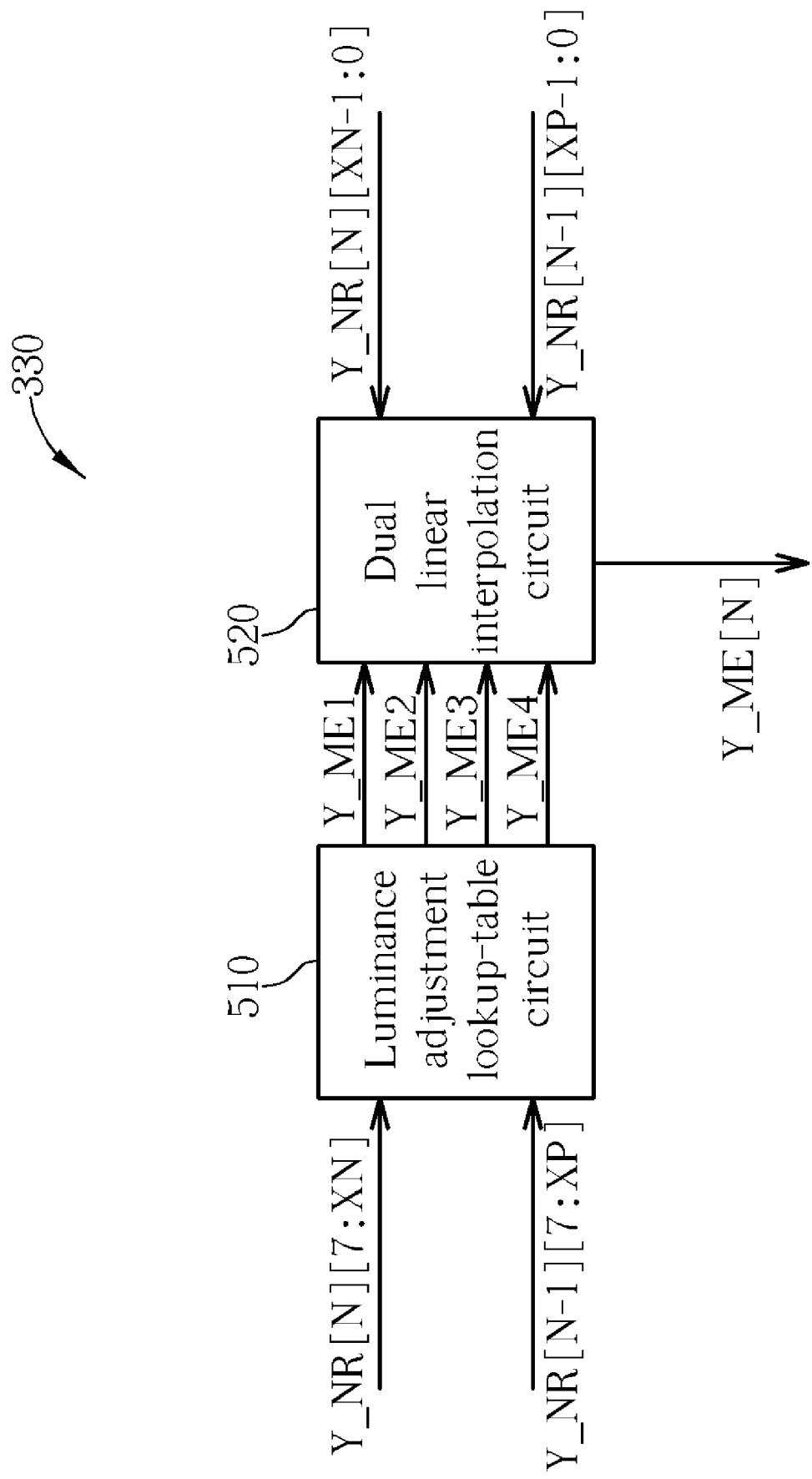
FIG. 5 is a block diagram of a motion enhancing circuit according to the present invention.

Please refer to FIG. 5 in conjunction with FIG. 3. FIG. 5 is a block diagram of a motion enhancing circuit 330 according to the present invention. The motion enhancing circuit 330 receives the filtered signal Y_NR[N], which is generated through performing the temporal noise reduction operation on the $N^{th}$ frame, and reads the filtered signal Y_NR[N−1] from the storage device 320, the filtered signal being generated by performing the temporal noise reduction operation on the $(N-1)^{th}$ frame. Then, the luminance adjustment lookup-table circuit 510 generates a plurality of adjustment coefficients according to the filtered signal Y_NR[N] and the filtered signal Y_NR[N−1]. Assume that the filtered signal Y_NR[N] and the filtered signal Y_NR[N−1] are both 8-bit signals. The luminance adjustment lookup-table circuit 510 refers to the most significant bits (MSB) to generate the adjustment coefficients. For example, the bits from the $XN+1^{th}$ bit to the $8^{th}$ bit of the filtered signal Y_NR[N] and the bits from the $XP+1^{th}$ bit to the $8^{th}$ bit of the filtered signal Y_NR[N−1] can be utilized. Because the luminance adjustment lookup-table circuit 510 is a two-dimensional lookup-table circuit, the luminance adjustment lookup-table circuit 510 generates four adjustment coefficients Y_ME1, Y_ME2, Y_ME3, and Y_ME4. The dual linear interpolation circuit 520 then performs the interpolation on the filtered signal Y_NR[N] and the filtered signal Y_NR[N−1] according to the above-mentioned adjustment coefficients. In the actual implementation, the dual linear interpolation circuit 520 performs the dual linear interpolation on the least significant bits (LSB) of the filtered signal Y_NR[N] and the filtered signal Y_NR[N−1]. Assume that the filtered signal Y_NR[N] and the filtered signal Y_NR[N−1] are both 8-bit signals. The interpolation is performed on the bits from the first bit to the $XN^{th}$ bit of the filtered signal Y_NR[N] and the bits from the first bit to the $XP^{th}$ bit of the filtered signal Y_NR[N−1] such that the motion enhanced signal Y_ME[N] of the $N^{th}$ frame is generated.

Figure 6:
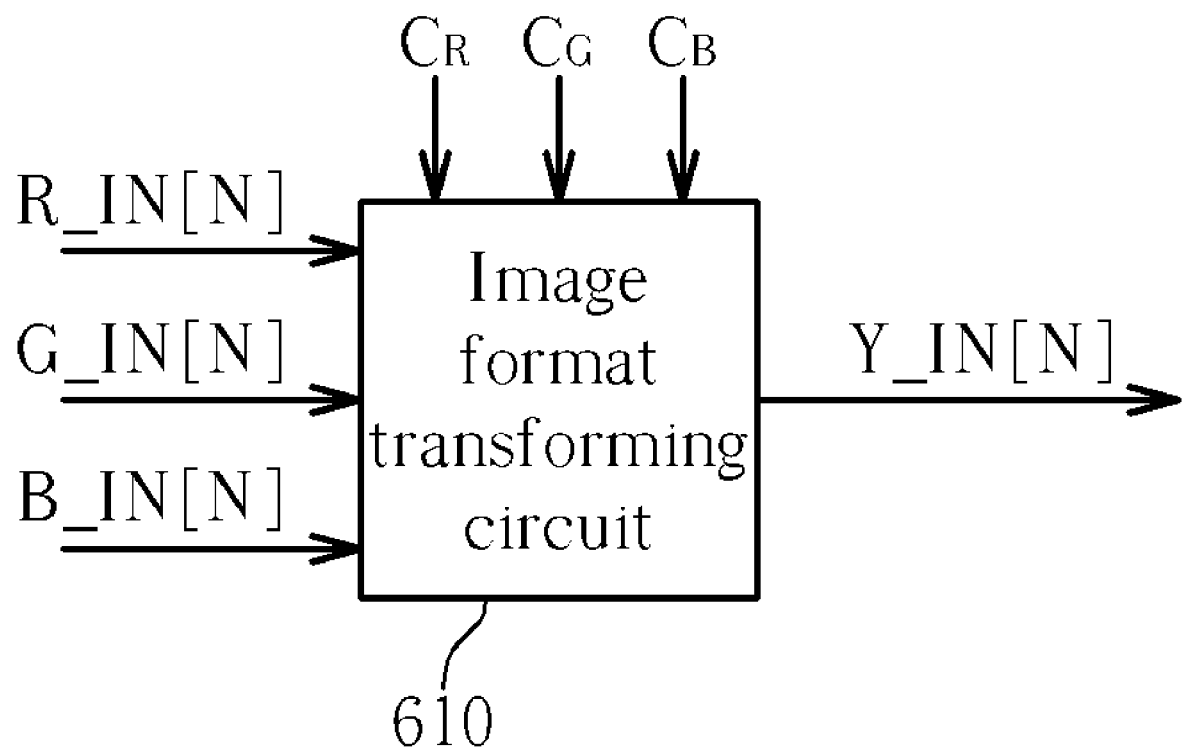
FIG. 6 is a block diagram of an image format transforming circuit according to the present invention.

Please note that the above-mentioned embodiment can further comprise an image format transforming circuit for transforming a first image format into a second image format for the device 300 to use. Please refer to FIG. 6, which is a block diagram of an image format transforming circuit 610 according to the present invention. As shown in FIG. 6, the image format transforming circuit 610 receives a frame, corresponding to an RGB signal R_IN[N], G_IN[N], and B_IN[N], and determines the mixing portions of the R, G, B components according to three weighting factors $C_R$, $C_G$, and $C_B$ to transform the RGB signal into a YUV signal such that a luminance signal Y_IN[N] is outputted. The relationship between the luminance signal Y_IN[N] and the RGB signal R_IN[N], G_IN[N], and B_IN[N] can be described by the following equation:

$$Y\_IN[N]=C_R \times R\_IN[N]+C_G \times G\_IN[N]+C_B \times B\_IN[N] \quad \text{equation (2)}$$

where $C_R$ is a weighting factor of the red signal R_IN[N], $C_G$ is a weighting factor of the green signal G_IN[N], and $C_B$ is a weighting factor of the blue signal B_IN[N]. The three weighting factors can be determined by a user. The transformed luminance signal Y_IN[N] can be the input signal of the device 300.

In order to co-operate with the image format transforming circuit 610, after the temporal noise reduction operation and the motion enhancement operation are performed on the image frame, an image signal adjusting circuit can be utilized to adjust the first color format signals that have not been transformed, according to the motion-enhanced signal Y_ME[N].

Figure 7:
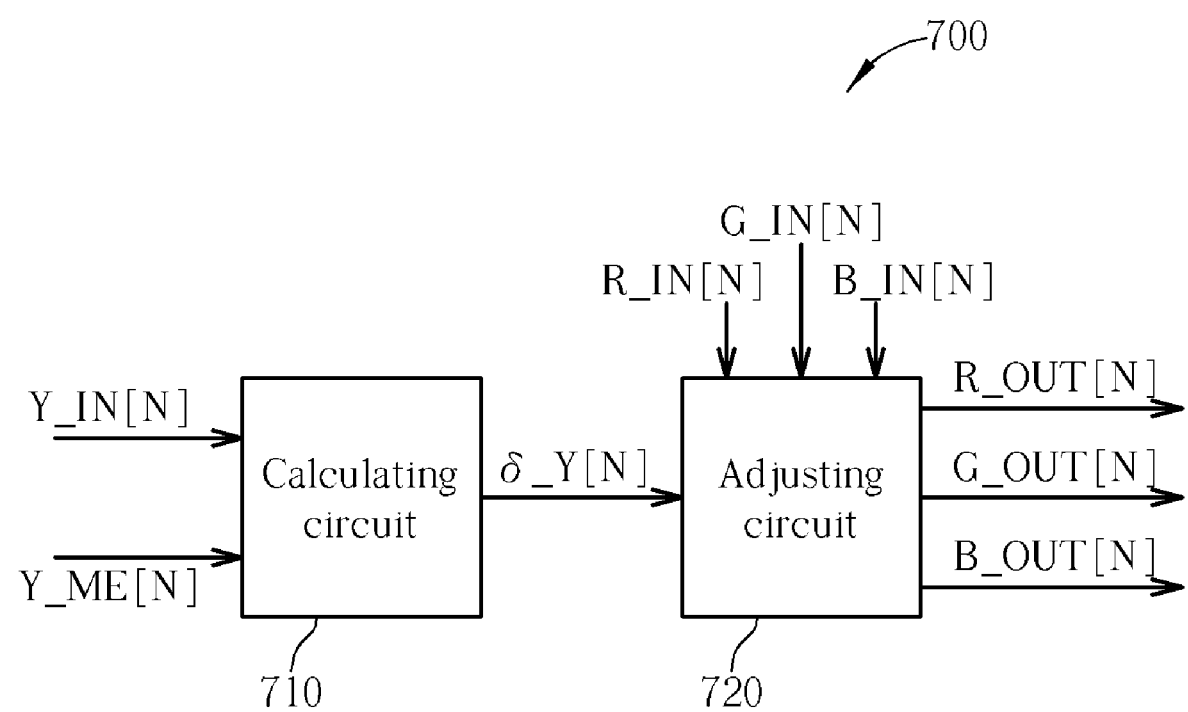
FIG. 7 is a block diagram of an image signal adjusting circuit according to the present invention.

Please refer to FIG. 7, which is a block diagram of an image signal adjusting circuit 700 according to the present invention. As shown in FIG. 7, the image signal adjusting circuit 700 comprises a calculating circuit 710 and an adjusting circuit 720. The calculating circuit 710 receives the luminance signal Y_IN[N] and the motion-enhanced signal Y_ME[N] and calculates the difference between the luminance signal Y_IN[N] and the motion-enhanced signal Y_ME[N] according to the following equation to generate the adjusting signal δ_Y[N].

$$\delta\_Y[N]=Y\_ME[N]-Y\_IN[N] \quad \text{equation (3)}$$

The adjusting circuit 720 receives the RGB signal R_IN[N], G_IN[N], and B_IN[N] and the adjusting signal δ_Y[N], and adjusts the RGB input signal R_IN[N], G_IN[N], and B_IN[N] according to the following equation such that the adjusted output signal R_OUT[N], G_OUT[N], and B_OUT[N] is generated.

$$\begin{cases} R\_OUT[N] = R\_IN[N] + \delta\_Y[N]; \\ G\_OUT[N] = G\_IN[N] + \delta\_Y[N]; \\ B\_OUT[N] = B\_IN[N] + \delta\_Y[N]. \end{cases} \quad \text{equation (4)}$$

Please note that the final output signal R_OUT[N], G_OUT[N], and B_OUT[N] is an RGB signal corresponding to the result of performing the temporal noise reduction operation and the motion enhancement operation on the image frame.

To sum up, the present invention can integrate the temporal noise filtering device and motion enhancer into the same circuit. Therefore, the above-mentioned devices can share the same storage device and the circuit cost can be reduced. Furthermore, before reducing the temporal noise of an image frame and enhancing the motion of the image frame, the signal of the image frame can be transformed from the first image format into the second image format. After the temporal noise reduction operation and the motion enhancement operation are performed, another image signal adjusting circuit can be utilized to adjust the signal corresponding to the first image format. This allows the present invention device for temporal noise reduction and motion enhancement to be more flexible.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A device for reducing temporal noise of a target frame and for implementing a motion enhancement operation for the target frame, the device comprising:
    a storage device, for storing a first filtered signal of a previous frame preceding the target frame;
    a temporal noise reducing circuit, coupled to the storage device, for receiving the first filtered signal and a first image signal corresponding to the target frame, reducing the temporal noise of the target frame according to the first filtered signal and the first image signal to generate a second filtered signal corresponding to the target frame, and storing the second filtered signal into the storage device; and
    a motion enhancing circuit, coupled to the storage device and the temporal noise reduction circuit, for implementing the motion enhancement operation for the target frame according to the first filtered signal and the second filtered signal to generate a motion-enhanced signal corresponding to the target frame.

2. The device of claim 1, further comprising: an image format transformation circuit, coupled to the temporal noise reducing circuit, for receiving a plurality of second image signals corresponding to the target frame, and transforming the second image signal into the first image signal.

3. The device of claim 2, further comprising: an image signal adjusting circuit, coupled to the motion enhancing circuit, for adjusting the second image signal according to the first image signal and the motion-enhanced signal.

4. The device of claim 3, wherein the image signal adjusting circuit comprises: a calculating circuit, coupled to the motion enhancing circuit, for receiving the first image signal and the motion-enhanced signal to generate an adjusting signal; and an adjusting circuit, coupled to the calculating circuit, for adjusting the second image signal according to the adjusting signal.

5. The device of claim 1, wherein the temporal noise reducing circuit comprises: a motion evaluating unit, for generating a motion-evaluated value according to the first filtered signal and the first image signal; and a blending circuit, coupled to the motion evaluating unit, for blending the first filtered signal and the first image signal to generate the second filtered signal according to the motion-evaluated value.

6. The device of claim 1, wherein the motion enhancing circuit generates a plurality of interpolation coefficients according to the first filtered signal and the second filtered signal, and performs a dual linear interpolation on the first filtered signal and the second filtered signal according to the plurality of interpolation coefficients to generate the motion-enhanced signal.

7. The device of claim 1, wherein the storage device is a dynamic random access memory (DRAM) or a static random access memory (SRAM).

8. A method for reducing temporal noises of a target frame and for implementing a motion enhancement operation for the target frame, the method comprising:
    providing a storage device;
    filtering a previous frame to generate a first filtered signal and storing the first filtered signal into the storage device, wherein the previous frame precedes the target frame;
    reducing the temporal noises of the target frame according to the first filtered signal and a first image signal corresponding to the target frame to generate a second filtered signal corresponding to the target frame, and storing the second filtered signal in the storage device; and
    implementing the motion enhancement operation for the target frame according to the first filtered signal and the second filtered signal and generating a motion-enhanced signal corresponding to the target frame.

9. The method of claim 8, further comprising: transforming a second image signal corresponding to the target frame into the first image signal.

10. The method of claim 9, further comprising: adjusting the second image signal according to the first image signal and the motion-enhanced signal.

11. The method of claim 8, wherein the step of generating the second filtered signal comprises: generating a motion-evaluated value according to the first filtered signal and the first image signal; and blending the first filtered signal and the first image signal according to the motion-evaluated value to generate the second filtered signal.

12. The method of claim 8, wherein the step of enhancing the motion of the target frame comprises: generating a plurality of interpolation coefficients according to the first filtered signal and the second filtered signal and performing a dual linear interpolation on the first filtered signal and the second filtered signal to generate the motion-enhanced signal.

13. The method of claim 8, wherein the storage device is a dynamic random access memory (DRAM) or a static random access memory (SRAM).

* * * * *